No. 868,725. PATENTED OCT. 22, 1907.
N. THEISEN & P. T. BECKER.
ASH SIFTER.
APPLICATION FILED AUG. 10, 1906.
3 SHEETS—SHEET 1.
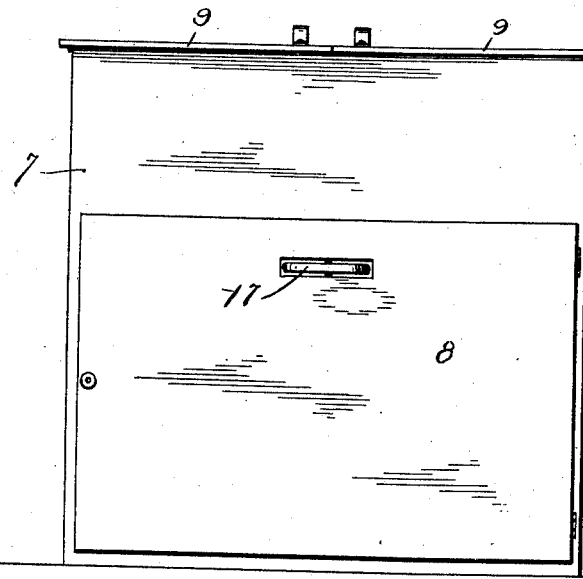
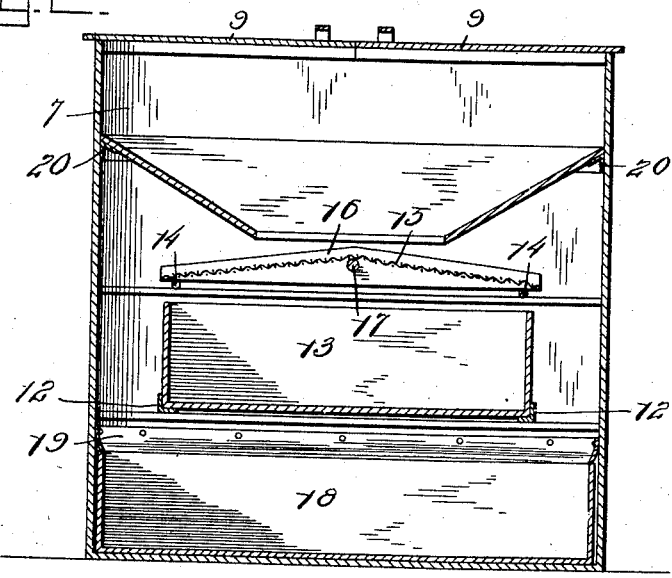
Witnesses
Inventors
N. Theisen, and
P. T. Becker.

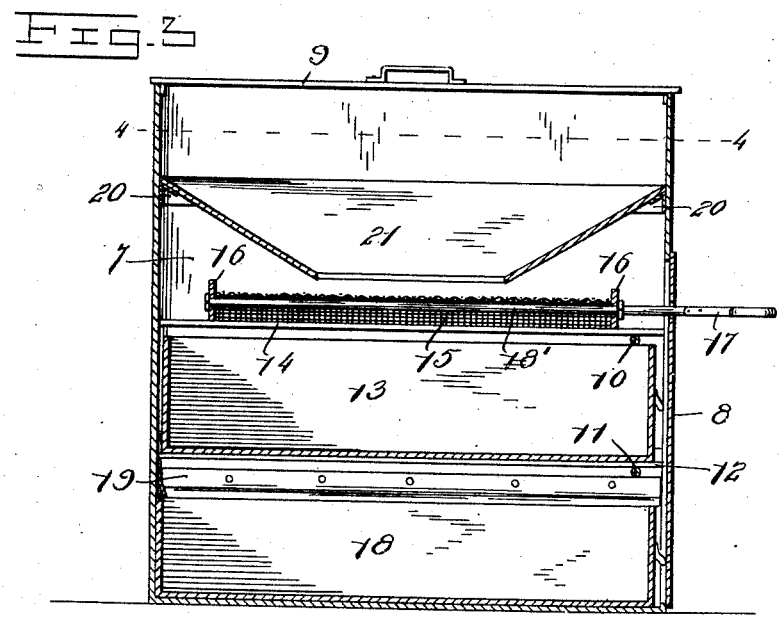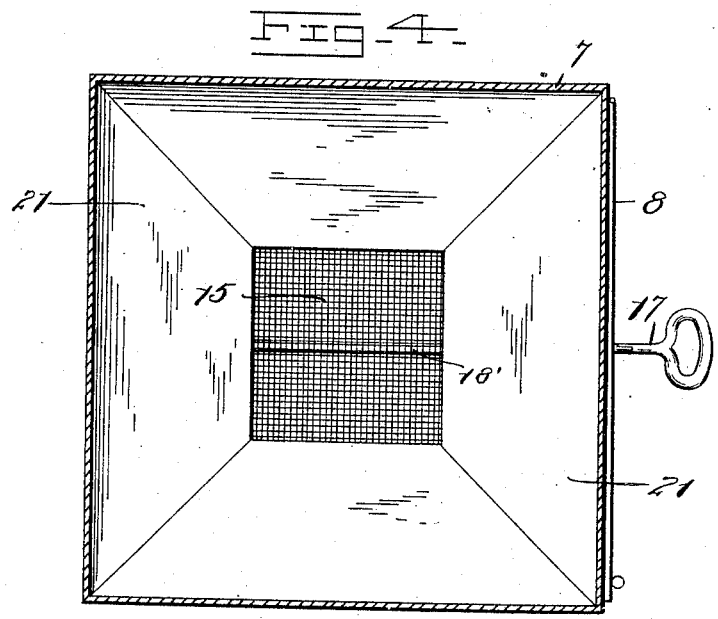

No. 868,725. PATENTED OCT. 22, 1907.
N. THEISEN & P. T. BECKER.
ASH SIFTER.
APPLICATION FILED AUG. 10, 1906.

3 SHEETS—SHEET 3.

Witnesses
L. Armstrong.
F. B. MacNal

Inventors
N. Theisen, and
P. T. Becker
By Chandler & Chandler.
Attorneys

UNITED STATES PATENT OFFICE.

NIC THEISEN AND PETER T. BECKER, OF PORT WASHINGTON, WISCONSIN.

ASH-SIFTER.

No. 868,725.		Specification of Letters Patent.		Patented Oct. 22, 1907.

Application filed August 10, 1906. Serial No. 330,038.

*To all whom it may concern:*

Be it known that we, NIC THEISEN and PETER T. BECKER, citizens of the United States, residing at Port Washington, in the county of Ozaukee, State of Wisconsin, have invented certain new and useful Improvements in Ash-Sifters; and we do hereby declare the following to be a full, clear, and exact description of the invention, such as will enable others skilled in the art to which it appertains to make and use the same.

This invention relates to ash sifters and has for its object to provide a sifter which will be so arranged that ashes may be quickly and easily sifted thereby, and which will include separate ash and coal receptacles to receive the different products after sifting.

Another object is to provide a sifter including an arrangement of parts tending to produce a valuable and efficient article of this kind.

Other objects and advantages will be apparent from the following description, and it is to be understood that I do not desire to be limited to the exact details of construction shown and described, for obvious modifications will occur to a person skilled in the art.

Figure 5:
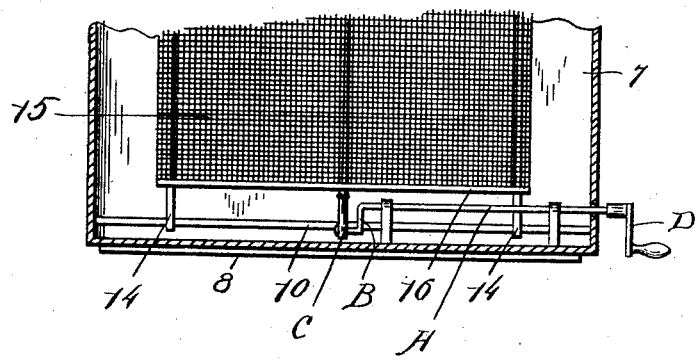
Figure 6:
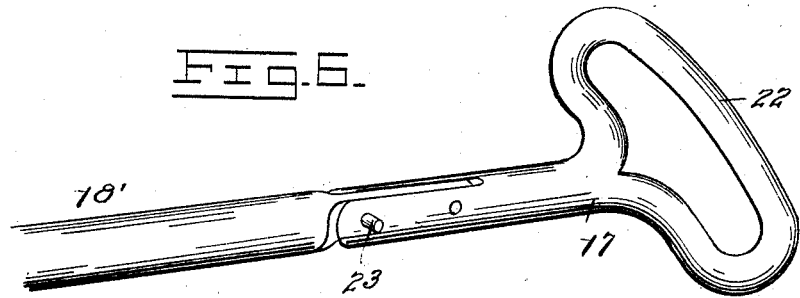

In the drawings forming a portion of this specification and in which like numerals of reference indicate similar parts in the several views, Figure 1 is an elevational view of the present sifter, Fig. 2 is a vertical section taken centrally on line 2—2 of Fig. 1, transversely of the screen, Fig. 3 is a section taken at right angles to Fig. 2, longitudinally of the screen, Fig. 4 is a transverse section on line 4—4 of Fig. 3, taken above the chute, Fig. 5 is a section showing a modification embodying a different method of reciprocating the screen, Fig. 6 is an enlarged detail showing the structure of the handle, illustrated in the first four views.

Referring now to the drawings, the present invention comprises a hollow body portion 7, rectangular in cross section and open at its top and the lower portion of its front wall, a vertically hinged door 8 being provided for movement into and out of position to close the lower portion of the front wall, and a pair of hinged lids 9 being provided for the top. A pair of vertically spaced, transversely extending bars 10 and 11, which numerals refer to the upper and lower bars respectively, are secured to the forward portion of the body portion, and a pair of transversely spaced, horizontal angle rails 12 are secured at their forward ends to the bar 10, and at their rearward ends to the rearward wall of the body portion, and have slidably mounted thereupon, an ash receiving drawer 13, which lies in spaced relation to the sides of the body portion, and secured to the bar 10 and to the rearward wall, in vertical alinement with the rails 12, there are a pair of rails 14 which receive thereupon, a forwardly and rearwardly extending longitudinally movable screen 15, the side portions of which are bent downwardly to slant away from the longitudinal central axis of the screen, and this screen extends just beyond the rails 14, guard strips 16 being carried by the ends of the screen to prevent the passage of matter therefrom except at the sides.

A forwardly extending handle 17 is secured to the screen, and extends outwardly through an opening in the door 8 for reciprocation of the screen when the door is closed.

A coal-receiving drawer 18 is slidably engaged in the bottom of the body portion, and extends laterally beyond the sides of the drawer 13, and beyond the screen, to receive matter falling from the sides of the screen. Inwardly extending diagonal guard plates 19 being secured to the sides of the body portion above the drawer 18, and projecting thereover to prevent the passage of matter between the drawer and the sides of the body portion.

Supporting strips 20 are secured within the body portion and receive thereupon the upper edge of a hopper 21 which is arranged to discharge upon the screen 15, and, as will be readily understood, ashes to be sifted may be deposited through the open top of the body portion, and will fall through the hopper to the screen, when reciprocation of the latter will cause the ashes to fall therethrough into the drawer 13, while the larger particles of coal fall downwardly over the sides of the drawer 13 to the drawer 18.

The handle 17 includes a rod 18′ and a grip 22 which is hinged thereto, so that it may be folded down over the forward face of the drawer 8, or held in normal position by a keeper pin 23.

In Fig. 5, there is shown a form of the invention in which a horizontal shaft A is journaled upon the inner face of the front wall of the body portion, above the opening, and has a clamp B at its inner end connected by means of a link C with the screen 15, the shaft extending outwardly beyond the body portion, and having an operating crank D removably engaged in its outer end.

What is claimed is:

A sifter comprising in combination, a hollow body portion; an open-ended hopper disposed within said body portion towards the top thereof; a pair of superposed drawers located in the bottom of said body portion, the upper drawer having its side walls terminating short of the side walls of the body portion for the passage of matter therebetween into the lower drawer; a reciprocatory screen triangular in cross-section disposed between said hopper and upper drawer, said screen having its apex portion arranged directly beneath the open lower end of the hopper, for the passage of matter therethrough into the upper drawer, and for the passage of matter therefrom between the side walls of the upper drawer and the body portion into the lower drawer; and an operating handle connected to said screen.

In testimony whereof, we affix our signatures, in presence of two witnesses.

NIC THEISEN.
PETER T. BECKER.

Witnesses:
WM. F. SCHANEN,
N. C. GRASSER.